United States Patent [19]

Kerwin

[11] Patent Number: 4,546,711
[45] Date of Patent: Oct. 15, 1985

[54] APPARATUS AND METHOD FOR INCINERATING WASTE MATERIAL WITH A CONVERTED PREHEATER-TYPE LIME KILN

[75] Inventor: John M. Kerwin, Flossmoor, Ill.

[73] Assignee: Marblehead Lime Company, Chicago, Ill.

[21] Appl. No.: 544,627

[22] Filed: Oct. 24, 1983

[51] Int. Cl.[4] ............................................... F23G 5/06
[52] U.S. Cl. .................................. 110/246; 110/216; 110/226; 110/254; 110/342; 110/346; 432/13; 432/14; 432/106
[58] Field of Search ............... 110/203, 216, 224, 225, 110/226, 234, 235, 246, 255, 264, 275, 276, 342, 346; 432/13, 14, 106

[56] References Cited

U.S. PATENT DOCUMENTS

| | | | |
|---|---|---|---|
| 2,212,062 | 8/1940 | Duerr et al. | 110/246 |
| 4,198,201 | 4/1980 | Rohrbach | 432/13 |
| 4,245,571 | 1/1981 | Przewalski | 110/246 |
| 4,260,369 | 4/1981 | Warshawsky | 432/106 |
| 4,301,750 | 11/1981 | Fio Rito et al. | 110/246 |
| 4,303,477 | 12/1981 | Schmidt et al. | 110/342 |
| 4,367,096 | 1/1983 | Wadia | 432/13 |
| 4,392,353 | 7/1983 | Shibuya et al. | 432/14 |
| 4,416,696 | 11/1983 | Zagar, et al. | 432/13 |

Primary Examiner—Albert J. Makay
Assistant Examiner—Steven E. Warner
Attorney, Agent, or Firm—McDougall, Hersh & Scott

[57] ABSTRACT

Apparatus and method for incinerating toxic and non-toxic waste using a modified preheater-type lime kiln is disclosed wherein the kiln is modified to incinerate waste and the preheater section is modified to provide an incineration processing aid such as limestone and also to more efficiently utilize and conserve heat values.

11 Claims, 3 Drawing Figures

FIG_2

APPARATUS AND METHOD FOR INCINERATING WASTE MATERIAL WITH A CONVERTED PREHEATER-TYPE LIME KILN

BACKGROUND OF THE INVENTION

The invention is generally concerned with incineration of both toxic and non-toxic waste material. In particular, the invention provides an apparatus and method for modification of a preheater-type kiln into an efficient waste incinerator.

Various attempts have been made to dispose of waste materials through the use of incinerators. Such attempts have included rotary kilns or furnaces of a similar nature, and reference is made to U.S. Pat. Nos. 723,959 (Wheildon); 2,212,062 (Duerr et al); 2,501,977 (Wallerstedt et al.); 3,436,061 (Zinn); 3,584,609 (Lerner); and 3,861,336 (Koyanagi) as illustrative of such prior attempts.

Disposal of waste materials with currently known systems have been satisfactory to some extent, however, difficulties remain. Such difficulties relate to a continuing need for more efficient systems for waste disposal. These needs are exacerbated by increasing waste generation and accumulation in the face of more restrictive environmental regulation. Furthermore, hazardous wastes have recently been recognized as presenting more significant problems than earlier thought, and therefore effective means for disposing of waste of this type are particularly desirable.

SUMMARY OF THE INVENTION

The apparatus and methods of the present invention utilize a basic preheater-type kiln of modified design capable of efficient incineration of both toxic and non-toxic waste materials including sewage sludge. Advantageously, existing preheater-type lime kilns may be inexpensively and quickly modified to provide an efficient waste incinerator capable of destroying a variety of waste materials. The processes and apparatus of the invention are particularly useful in instances where large amounts of wastes must be handled on a substantially continuous basis.

The inventive apparatus may be considered a novel combination of a rotary kiln adapted for incineration with various preheating and heat exchange apparatus for efficient operation along with additional supporting equipment. Advantageously, apparatus and processes of the present invention provide an economical alternative to the currently environmentally suspect methods of landfill storage. Beneficially, the inventive incinerator and process may be utilized to destroy, render environmentally safe and/or reduce the volume of such high volume wastes as municipal garbage, sanitary sewerage, industrial waste by-products, etc., as well as hazardous or toxic wastes such as hospital wastes, expired pharmaceuticals, PCB-containing transformer oils, etc. In addition to safe disposal of currently generated wastes, there exists a pressing need for an economical means to clean up ecological disaster areas such as Love Canal, Times Beach, etc. The present invention may be utilized to decontaminate large volumes of soil as well as whole drums containing hazardous or toxic chemicals. Generally, material to be incinerated is admixed with a preheated processing aid such as limestone prior to or during incineration. Also, preheated air for combustion is used in firing the kiln, thereby increasing efficiency and economic operation. Waste material such as sewage sludge is supplied to the hot zone of a rotary kiln, for example, by means of a rotary scoop feeder. Predominantly gaseous incinerated waste material is removed by means which generally provide a negative pressure throughout the incineration system such as an exhaust fan. This negative pressure beneficially reduces or eliminates leaks of noxious gases throughout the waste incinerator system. Predominantly non-gaseous incinerated waste is also removed from the kiln, for example, by the force of gravity when the kiln is operated on a slant to the horizon. Continuous introduction of waste material and processing aid and continuous removal of the incinerated mixture provides a highly efficient and effective system for treatment of waste material leading to ultimate disposal.

The inventive process requires the use of limestone as a processing agent in waste incineration. By limestone is meant those rocks customarily known as such including predominantly calcium carbonate containing rocks such as calcite and carbonate rocks relatively rich in magnesium carbonates such as dolomitic limestone. Under some conditions it is believed that dolomitic limestone may be employed advantageously relative to high calcium limestone to better prevent heavy metals from leaching out of clinker or incinerated solids and collected dust on a long term basis. It should be recognized that the composition of materials customarily termed "limestone" will vary and that such various forms of limestone may be used and are contemplated by the present invention. The amount of limestone utilized in the inventive process will vary depending upon different process parameters chosen, including, for example, the particular composition of the limestone used, as well as the composition and amount of waste material to be incinerated. The proper ratio of limestone to waste material (as well as other process parameters) will depend upon practical considerations such as convenience, efficiency, and economy. These parameters may readily be determined for each type of material to be incinerated without undue experimentation.

Advantageously, use of limestone in the novel process can facilitate removal of undesirable anionic gases formed during incineration. Sulphur-containing and halogen-containing compositions may be removed by limestone treatment. Also, since limestone and lime (lime is formed from limestone upon heating) are basic, then brick life of the kiln and preheater may be lengthened. Dust generated by the process of feeding limestone to the kiln and calcined lime formed from heated limestone are of further benefit to the present invention. This limestone/lime dust is believed to provide nuclei for the accumulation of heavy metals, trace metals, and/or alkali particles to thereby facilitate metal removal, for example, by a filter baghouse. Furthermore, the limestone/lime dust may provide a precoat for filter bags in the baghouse, thereby further reducing particulates and prolonging baglife. The clinker and collected dust, associated with the free lime, is believed to assist in prevention of leaching of most metals. Also, limestone acts as a mixing agent or agitation media in the kiln causing improved heat transfer. A still further advantage of limestone is its ability to retard formation of a liquid phase of clinker in the hot zone of the kiln. Additionally, when hard or lumpy waste is introduced for incineration, limestone may act as a cushion to the kiln. It is noted that it is not necessary in the present and inventive process for limestone to exhibit all of the

DETAILED DESCRIPTION OF THE INVENTION

Figure 1:
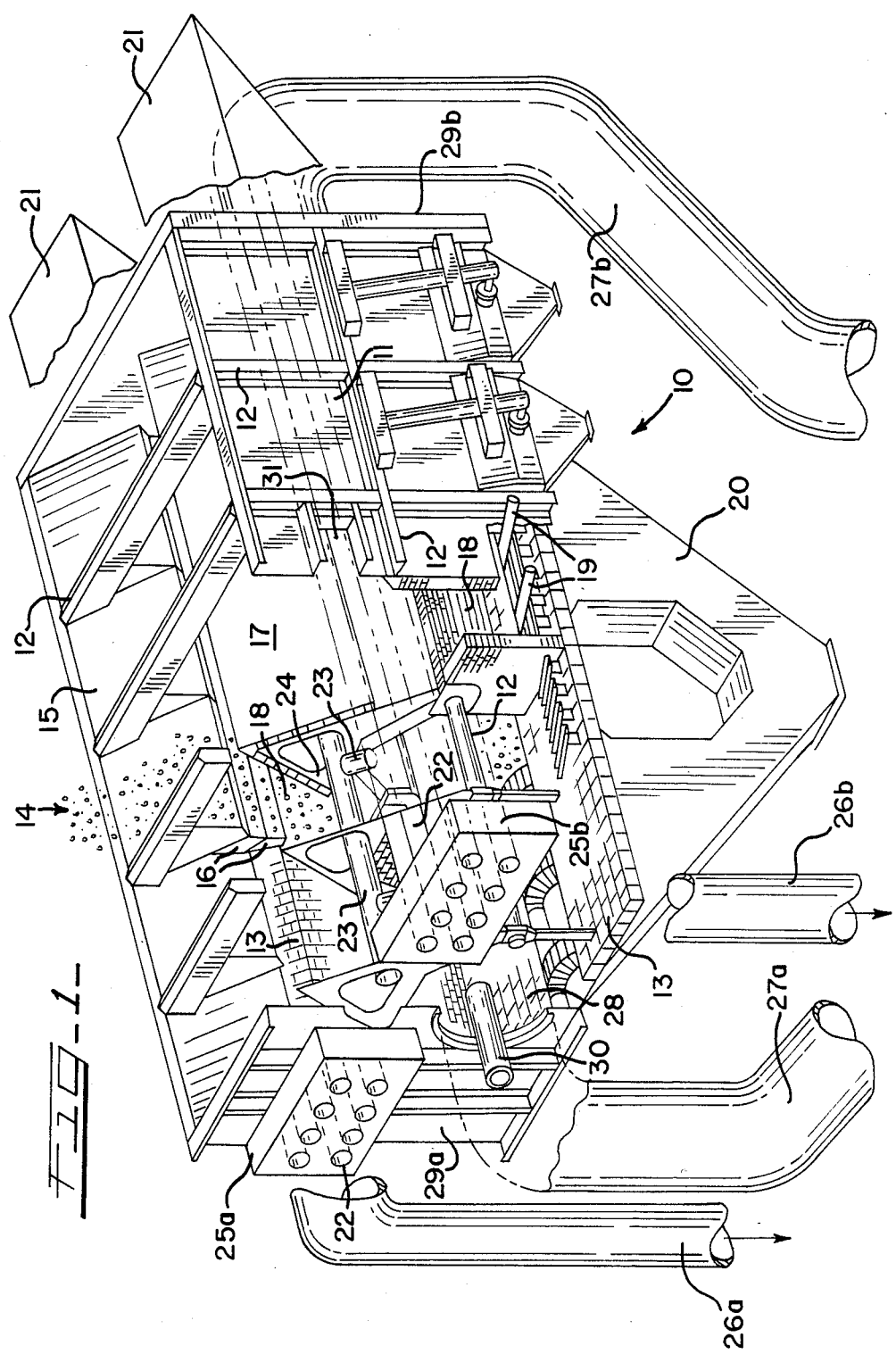
FIG. 1 comprises a partial cross-sectional isometric view of a preheater of a rotary kiln and associated mechanisms of the type contemplated by this invention.

Referring to FIG. 1 a typical lime kiln preheater 10 is depicted which has been modified according to the present invention. The preheater chosen for modification may generally be of any shape e.g. round, square or rectangular. The rectangular preheater depicted is illustrative of the necessary modifications. Preheater 10 includes a housing 11 having supporting beams 12, and lined with refractory brick 13. A processing aid, preferably limestone 14, is supplied from an attached storage bin (not depicted) and funneled downward by cover plate 15 having adjustable flaps 16 and diverter plate 17 to preheat zone 18 from which heated limestone 14 is transported through means for transferring said processing agent such as automatically controlled plungers 19, hopper 20 and an insulated duct (not shown) to a rotary kiln (see FIG. 3). Control damper means 21 provide air for combustion through preheater means such as heat exchange tubing 22 and cooling pipe 23 located in preheating zone 18 and center partitions 24, respectively. Tubing 22 and cooling pipe 23 are connected to means for transferring said preheated air to firing means of a kiln, such transfer means include tube collector boxes 25a and 25b and insulated pipes 26a and 26b. Heating in preheater 10 is accomplished by heat transfer from hot gases introduced to preheater 10 by insulated ducts 27a and 27b. Hot incineration gases from duct 27a passes through gas inlet 28 into preheater zone 18. Preferably two gas inlets are utilized on opposing side walls 29a and 29b. Preheater 10 is also provided with two afterburners to provide further incineration of waste gases. An afterburner 30 is located at each gas inlet 28 including a gas inlet (not depicted) on side wall 29b. These afterburners may be used to supply additional heat to preheating zone 18 thereby increasing dwell time of waste at high temperatures. Thus, preheater 10 may act as a gas incinerator supplemental to the rotary kiln when the afterburners are fired. In this way, predominantly gaseous incinerated materials may be held at high temperature for a longer time in an efficient, economical and efficacious manner. Hot gases from pipes 27a, 27b and/or the afterburners are circulated among the limestone 14 and heat exchange tubing 22 and are finally routed out of the preheater 10 via cool gas outlet 31 to exhaust means (not shown).

Figure 2:
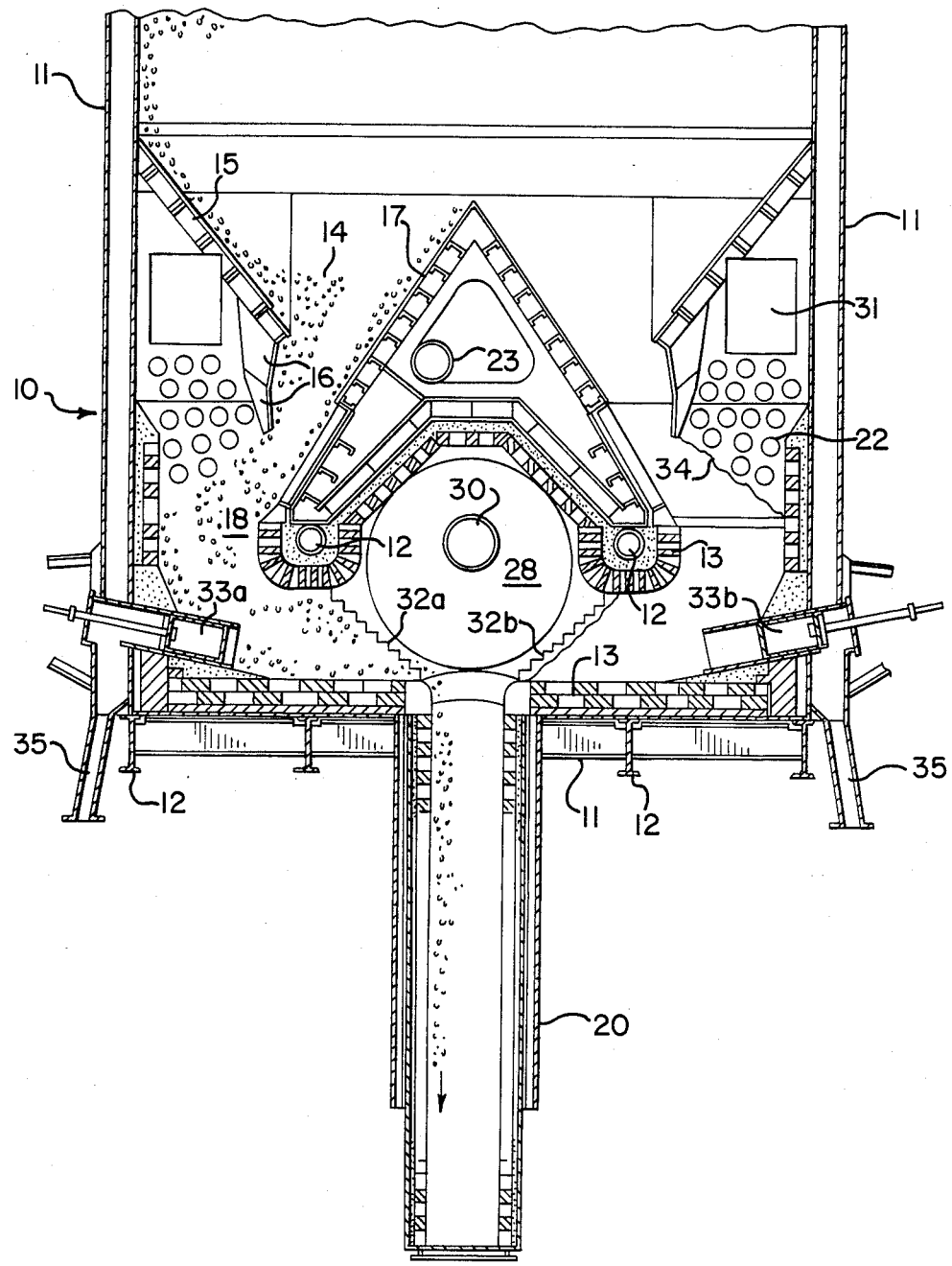
FIG. 2 is a partial cross-sectional elevated view of the preheater of FIG. 1.

Referring now to FIG. 2, a cross-sectional side elevation of a modified preheater 10 of the type shown in FIG. 1 is depicted. Preheater housing 11 having supporting beams 12 is lined with refractory brick 13. Limestone 14 is supplied by funneling with cover plate 15 having adjustable flaps 16 and diverter plate 17 to preheating zone 18. Preheater limestone 14 is retained by screens 32a and 32b until transferred by control plungers 33a and 33b to hopper 20. Control plunger 33a is depicted in an extended position while plunger 33b is retracted. Air for combustion is transferred through heat exchange tubing 22 located above the angle of repose 34 of the limestone 14 in the upper portion of preheat zone 18. The angle of repose 34 may be altered by adjustable flaps 16 to accommodate more or less heat exchange tubing 22. Hot gas inlet 28 is provided with an afterburner such as a gas fired burner 30 to further incinerate residual matter and waste gases introduced via inlet 28. Hot gases from the inlet 28 and/or burner 30 flow through the preheat zone 18 thereby heating the limestone 14 and tubing 22 located therein. These gases cooled by heat transfer are then removed via gas outlets 31. Preheater 10 is also equipped with plunger clean out ports 35 for easy maintenance and dust removal.

Figure 3:
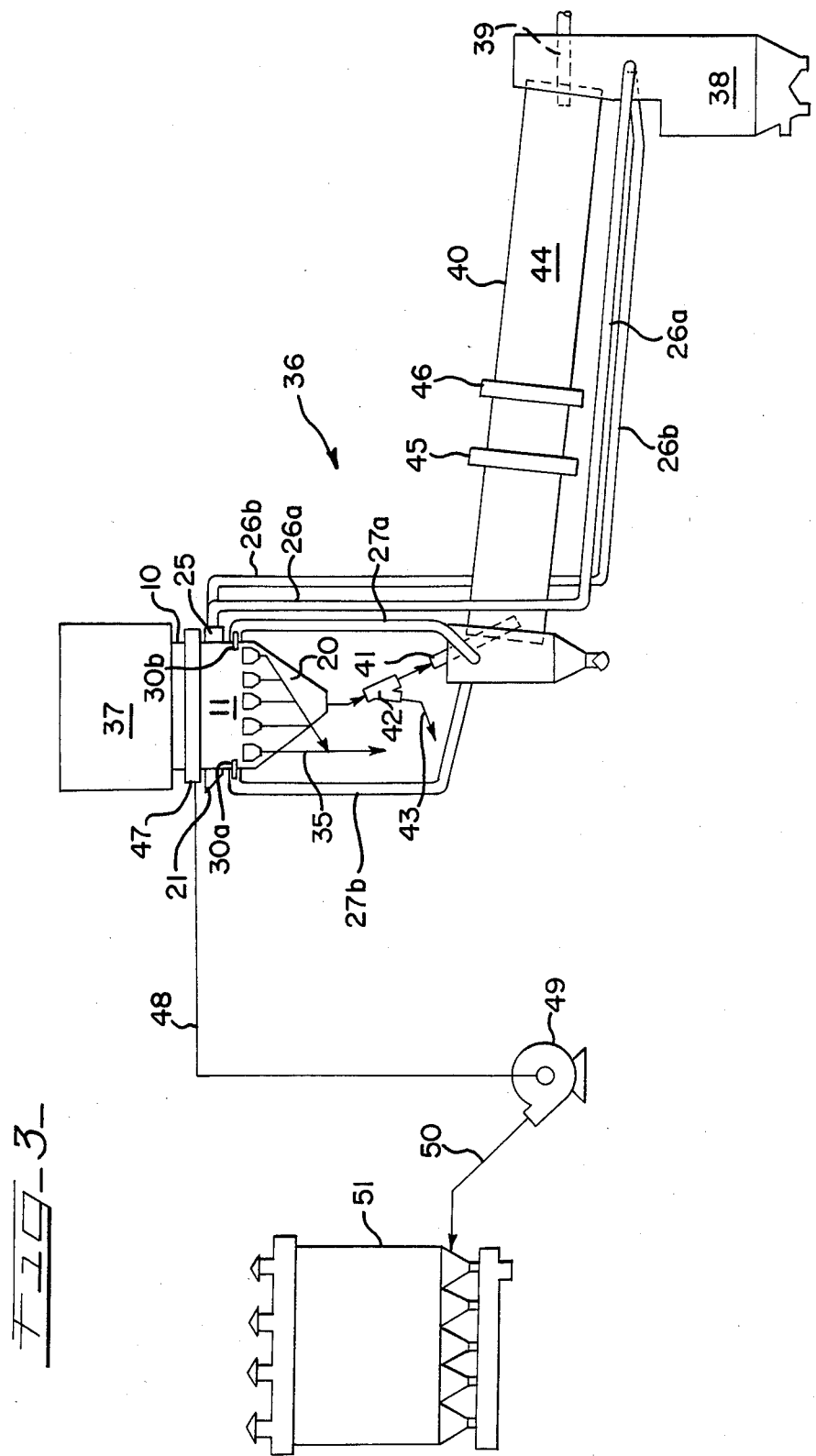
FIG. 3 is a schematic plan view of the preheater/rotary kiln incinerating system of the present invention.

Referring now to FIG. 3, a schematic plan view of an incineration system 36 is depicted which comprises a preheater 10 having a preheater housing 11 including a storage bin 37 for holding a supply of limestone (not shown). Air for combustion is drawn through damper control means 21 into preheater 10 and then conveyed via collector boxes 25 and insulated piping 26a and 26b to a point above the clinker level in clinker tank 38 and below the flame of firing means 39 for rotary kiln 40. Limestone (not shown) moves from bin 37 through the preheater 10 and hopper 20 to the upper end of rotary kiln 40 via transfer means such as insulating ducting 41. A valve 42 located in said ducting 41, provides an opening 43 for maintenance. Waste material is added to a hot zone 44 of said kiln 40 via waste introduction means such as a rotary scoop feeder 45. Preheated limestone is mixed with said waste and said mixture is incinerated in hot zone 44.

Beneficially, limestone will be added to the upper feed end of said kiln 40 above the hot zone 44, while wastes such as sewerage sludge will be added directly to the hot zone where mixing with limestone will occur. It should be noted that the point of introduction of the limestone as well as the material to be incinerated may be varied considerably depending upon the type and nature of the material to be incinerated. Generally, waste may be added anywhere between the upper end of the kiln 40 and the hot zone 44. Two process parameters of significance in determining where to introduce waste are temperature and dwell time. One skilled in the art will recognize that at a given temperature either science or environmental regulations will require a particular residence time at that temperature to effect sufficient incineration. Furthermore, dwell time may depend upon such parameters as kiln length, kiln rotation speed, point of waste introduction and type of waste. Thus, readily combustible material such as industrial solvents, oils, as well as materials requiring long residence time such as transformer oils containing PCB may be blown in the lower end of the kiln 40 adjacent to firing means 39. In contrast, liquids, solids, or dusts which produce larger amounts of clinker by-products may be introduced directly by pipe or rotating scoop feeder into the hot zone above the firing means at various points up to the upper end of the kiln. By matching the point of introduction with the particular waste to be incinerated, a sufficient dwell time may be set. In addition to a typical solid, liquid or gaseous waste feed, steel drums containing wastes may be loaded in the upper end of kiln 40 by a drum feeder.

Additives or processing aids, such as coal dust or iron pellets may be added separately or with wastes for their heat values or increased heat transfer. Also, a plurality of wastes may simultaneously be added to the kiln. Plural waste addition has the benefit of extracting heat values from one type of waste, such as industrial solvents blown in adjacent to firing means 39 and applying these heat values to incinerate another type of waste such as sewerage sludge introduced further up the hot zone.

Returning to FIG. 3, rotary drive 46 rotates said kiln incinerator causing heavy predominantly non-gaseous incinerated waste to move under force of gravity to the lower end of said kiln 40 where said waste is removed by solid removal means such as clinker tank 38. Predominantly gaseous incinerated waste material and oxidation gases from firing means 39 are removed via transfer means such as insulated piping 27a and 27b to the hot gas inlet (not shown) in preheater 10. Each hot gas inlet is equipped with a gas fired afterburner 30a and 30b. The cooled waste gases are then transferred via gas outlet duct 47 and conduit means 48 impelled by a negative pressure produced by exhaust fan 49. The fan 49 provides a negative pressure throughout system 36 thereby reducing or eliminating leaks of noxious gases and thus improving the overall effectiveness of the waste system. Fan 49 transfers said gaseous wastes via conduit means 50 to particulate removal means such as a filter bag house 51 where substantially purer effluent gases are then vented to the atmosphere.

Beneficially, hot waste gases and afterburner oxidation gases are cooled by heat exchange tubing located in preheater 10 sufficiently to prevent destruction of bags in filter baghouse 51. Generally, these exhaust gases may be cooled to about 550° F. Alternatively, heat values from hot waste gases and oxidation gases from the kiln and/or preheater may be utilized to supply heat to external operations such as a boiler for steam generation. Similarly, heat exchange tubing located in the preheater or similar means may be used to cool the preheater and then be routed to other external operations for extraction of heat values. Cleanout ports 35 provide access to preheater plungers (See FIG. 2) for maintenance.

It will be appreciated that other kilns such as cement kilns may be modified according to the present invention. Generally, a preheater of the type described above may be connected to a rotary kiln to arrive at the apparatus of the instant invention. A particular advantage of the present invention is the ability to modify short rotary kilns to operate as efficient and economical incinerators. Such modification of short kilns is made possible by use of the preheater modified with afterburners to increase the residence time of waste at high temeprature. Use of the modified preheater provides shorter rotary kiln incinerator with the dwell time of a longer kiln under substantially equivalent conditions. The temperature of the preheater may be controlled by firing the afterburners and/or adjusting the number and type of heat exchange tubes present.

Further modification of the preheater may be done by one skilled in the art in light of the present disclosure. All such modifications are deemed within the spirit and scope of the present invention. For example, a typical lime kiln preheater is built to accommodate temperatures of up to about 1600° F. but may be rebricked to withstand higher temperatures. Generally, typical materials for incineration may require temperatures of up to 3000° F.–4000° F. or higher.

Advantageously, incineration of sewerage sludge may be performed in accordance with EPA requirements by the present invention. Typical sludge may be introduced to a modified rotary kiln approximately 80 to 100 feet from the firing end into its hot zone which has been preheated to approximately 2100° F. Preheated limestone is fed into the kiln at a predetermined rate commensurate with the feed rate of the sludge and firing rate of the kiln. The rotational speed of the kiln is adjusted to insure a residence time for the clinker which is sufficient to break down waste relative to governmental regulations or desired combustion levels. Similarly, temperatures of about 1500° F. to 1800° F. are maintained to the preheater with preheater temperature controlled by afterburners to allow a residence time for the incinerated gases sufficient to break down wastes relative to governmental regulation or desired combustion level.

As mentioned above, suitable and preferred process parameters depend upon the waste to be incinerated as well as upon practical considerations such as efficiency, convenience and economy and may be determined without undue experimentation.

It will be understood that various changes and modifications may be made in the system described (which provides the characteristics o the invention) without departing from the spirit thereof particularly as defined in the following claims.

What is claimed is:

1. An apparatus for incinerating waste material comprising:

a rotary kiln; means for firing said kiln; means for preheating air for combustion; means for transferring said preheated air to said means for firing; means for preheating a processing agent; means for transferring said processing agent to said rotary kiln; means associated with said rotary kiln for introducing waste materials to a hot zone for said kiln; and means for removing incinerated material from said kiln;

said means for removing incinerated material comprising means for separating said incinerated material into a predominantly gaseous incinerated waste portion and a predominantly non-gaseous incinerated waste portion; means for removing said gaseous portion; and means for removing said non-gaseous portion; and wherein said means for preheating air comprise heat exchange tubing associated with said means for removing said gaseous portion, whereby incinerated waste gases having heat values are passed through said separating means associated with said rotary kiln and into contact with said tubing and said processing aid where said heat values are utilized to preheat both air for combustion and a processing aid;

and wherein said heat exchange tubing is substantially enclosed in a preheater housing, said preheater housing further comprising a processing aid storage bin; and said housing is further adapted to cooperate with said means for preheating a processing aid thereby enclosing said processing aid during preheating.

2. An apparatus as defined in claim 1 wherein said processing aid is limestone.

3. An apparatus as defined in claim 1 wherein said means for introducing waste material is a rotary scoop feeder.

4. An apparatus as defined in claim 1 wherein said means for removing said gaseous portion is adapted to provide heat to said means for preheating air.

5. An apparatus as defined in claim 1 wherein said means for removing said gaseous process is adapted to provide heat to said means for preheating a processing aid.

6. An apparatus as defined in claim 1 wherein said means for removing a gaseous portion comprises an exhaust fan; and a filter bag house for receiving gases withdrawn by said fan.

7. An apparatus as defined in claim 1 wherein:
said processing aid comprises limestone; said means for removing a gaseous portion comprises said preheater housing, an exhaust fan, connective ducting means, and a filter bag house for receiving gases withdrawn by said fan; and wherein said apparatus further comprises at least one afterburner associated with said preheater housing whereby said gaseous portion is further incinerated and heat values from said further incinerator and firing of said afterburner are utilized to preheat a processing aid and air for combustion.

8. An apparatus as defined in claim 1 wherein said means for preheating a processing aid and said means for preheating air for combustion further comprises at least one afterburner associated with said preheater housing whereby waste gases introduced by means for removing incinerated material are further incinerated and heat values are utilized therefrom to heat said processing aid and said air for combustion.

9. An apparatus as defined in claim 8 wherein said at least one afterburner comprises two afterburners located near opposite side ends of a generally rectangular preheater housing.

10. A method for converting a preheater-type lime kiln to an apparatus for incinerating waste material comprising modifying a preheater-type lime kiln which includes
    (a) preheater means including a storage bin, hot gas inlet, exhaust gas outlet, and preheater housing;
    (b) a rotary kiln including firing means;
    (c) transfer means for introducing limestone from said preheater means to said kiln; and
    (d) transfer means to supply heated gas from said kiln to said hot gas inlet of said preheater means; by
        (1) providing said preheater housing with heat exchange tubing capable of receiving air for combustion; said tubing being associated with the interior of said preheater housing whereby hot gases from said hot gas inlet heat air in said tubing which air is then conveyed by transfer means to said firing means of said kiln; and
        (2) providing said rotary kiln with means for supplying said waste material, said supply means adapted to supply waste material into a hot zone of said rotary kiln, and wherein said preheater-type lime kiln is modified by providing said preheater means with an auxiliary burner associated with said preheater means whereby gaseous incinerated waste sent by said transfer means to said hot gas inlet may be further incinerated.

11. A method as defined in claim 10 wherein said means for supplying waste material is a rotary scoop feeder.

* * * * *